(12) United States Patent
Duran Toro et al.

(10) Patent No.: US 8,508,402 B2
(45) Date of Patent: Aug. 13, 2013

(54) SYSTEM AND METHOD FOR DETECTING, LOCATING AND IDENTIFYING OBJECTS LOCATED ABOVE THE GROUND AND BELOW THE GROUND IN A PRE-REFERENCED AREA OF INTEREST

(75) Inventors: Mario Manuel Duran Toro, Santiago (CL); Marcelo Walter Guarini Herrmann, Santiago (CL)

(73) Assignee: Pontificia Universidad Catolica de Chile, Santiago (CL)

(*) Notice: Subject to any disclaimer, the term of this patent is extended or adjusted under 35 U.S.C. 154(b) by 307 days.

(21) Appl. No.: 12/735,344

(22) PCT Filed: Jan. 2, 2009

(86) PCT No.: PCT/ES2009/070001
§ 371 (c)(1),
(2), (4) Date: Sep. 23, 2010

(87) PCT Pub. No.: WO2009/087260
PCT Pub. Date: Jul. 16, 2009

(65) Prior Publication Data
US 2011/0037639 A1    Feb. 17, 2011

(30) Foreign Application Priority Data
Jan. 4, 2008   (CL) .................................... 00242008

(51) Int. Cl.
*G01S 13/00*   (2006.01)
(52) U.S. Cl.
USPC ........... 342/22; 342/27; 342/195; 342/357.24
(58) Field of Classification Search
USPC .................. 342/22, 25 R–25 F, 27, 179, 191, 342/357.24–357.26
See application file for complete search history.

(56) References Cited

U.S. PATENT DOCUMENTS

| | | | | |
|---|---|---|---|---|
| 2,639,426 A | * | 5/1953 | McAuley et al. | 342/8 |
| 5,499,029 A | * | 3/1996 | Bashforth et al. | 342/22 |
| 5,502,444 A | | 3/1996 | Kohlberg | |

(Continued)

FOREIGN PATENT DOCUMENTS

| EP | 1965223 A1 | 9/2008 |
|---|---|---|
| WO | WO 00/08590 A1 | 2/2000 |
| WO | WO 0171377 A1 | 9/2001 |

*Primary Examiner* — John B. Sotomayor
*Assistant Examiner* — Marcus Windrich
(74) *Attorney, Agent, or Firm* — Karim Lagobi

(57) ABSTRACT

The invention relates to a system and method for detecting, locating and identifying objects located above ground or below ground in an area of interest, comprising an airborne vehicle which circumscribes the area of interest and which includes a built-in radar having an antenna with a respective transmitter and receiver, signal-processing means, data-storage means and graphical interface means. According to the invention, the area of interest has been pre-referenced and the radar is a heterodyne ground penetration radar (GPR). The signal transmitted by the antenna generates a beam that illuminates a strip of earth, consisting of a sinusoidal electromagnetic signal having a frequency that is varied in precise predetermined progressive steps. This signal is mixed with the received (reflected) signal, thereby producing two sets of values corresponding to the phases of each frequency step or stage. Said sets of values, which are obtained throughout successive sweeps (as the antenna moves), are stored in the storage means and subsequently processed in the processing means in order to obtain a final map or image of the location of the objects above ground or below ground.

41 Claims, 6 Drawing Sheets

(56) References Cited

U.S. PATENT DOCUMENTS

| | | | |
|---|---|---|---|
| 5,673,050 A * | 9/1997 | Moussally et al. | 342/22 |
| 6,140,959 A * | 10/2000 | Gudat et al. | 342/357.25 |
| 6,982,666 B2 * | 1/2006 | Temes et al. | 342/22 |
| 2004/0118313 A1 | 6/2004 | Temes et al. | |
| 2006/0077095 A1 * | 4/2006 | Tucker et al. | 342/357.08 |
| 2006/0087471 A1 | 4/2006 | Hintz | |
| 2007/0024489 A1 | 2/2007 | Cerwin | |
| 2008/0246647 A1 * | 10/2008 | Hellsten | 342/22 |
| 2010/0052970 A1 * | 3/2010 | Moussally et al. | 342/22 |

* cited by examiner

SYSTEM AND METHOD FOR DETECTING, LOCATING AND IDENTIFYING OBJECTS LOCATED ABOVE THE GROUND AND BELOW THE GROUND IN A PRE-REFERENCED AREA OF INTEREST

This application is a U.S. national stage filing of International Application No. PCT/ES2009/070001 with international filing date of Jan. 2, 2009. The international Application claims priority of application CL00242008 filed Jan. 4, 2008.

FIELD OF THE INVENTION

The invention object of the present patent application relates to an integrated system for detecting, locating and identifying antipersonnel and antitank mines for application in humanitarian demining through a GPR based non-invasive electromagnetic geophysical technique.

DESCRIPTION OF PRIOR ART

Conventional antipersonnel mine detection has been carried out mainly through methods that are not different from those used during Second World War, that is, a human operator uses a metal detector and performs a thorough and slow scanning on the affected area. High false alarm rate leads to slow, very dangerous and expensive detection. Adjusting the detectors to decrease false alarm rate involves that some mines are not detected.

In the national and international scope, the situation is critical since there are no modern techniques, no reliable data to allow for carrying out good decision making with respect to demining process. It is thus apparent that in the absence of these advances, uncertain investments will still be made which will not generate knowledge, which will not involve country stakeholders that must and can generate value in this scope and do not consider fundamental variables which unnecessarily involves and increases risk.

Detection of hidden or even buried explosives is carried out through a wide range of methods: vapor release, driven neutrons and subsequent detection of gamma rays emitted in their interaction, X-rays, laser beams causing no detonation explosive ignition, electrical conductivity and other interactive ones in which the explosive, for example, a mine, is provided with a signaling system that can be activated by a signal sent by a mine field cleaning complementary tool. Location is also possible by direct contact, through a long, thin shaft.

A further technique to eradicate antipersonnel mines hosted in the outermost layer of the Earth is with the help of electromagnetic waves (airborne radar) based tools. This technique involves sending a radar signal and analyzing the return signal generated from wave reflections occurring in the discontinuities of the dielectric constants in the penetrated material, such as either ground and mine, or ground and rock. The image resolution is higher if the signal wavelength is lower, however the shorter the wavelength the lower the penetration into the ground.

However, very good results have been obtained by combining GPR (Ground Penetrating Radar) with EMI (Electromagnetic Induction). The great advantage of GPR is that changes in the dielectric are detected resulting in a wide range of mine housings that can be detected. An interesting advantage of GPR is that it can obtain horizontal sections from the subsoil at different depths forming a 3D subsoil image. The main disadvantages however are: non-homogeneous subsoil which may result in a large amount of false alarms in addition to very sensitive performance to complex interactions such as metal content, radar frequency, soil mixtures and surface soil smoothness (humidity, etc.).

GPR has been established as one of the best techniques for subsoil research. However, mine detection using GPR is complex mainly due to the material present in the site, such as rocks, stones, metals, waste, etc., dominating the obtained data and hiding mine information. This material varies with the irregularity of the surface and soil conditions, which involves taking into account uncertainty in measurements. For this reason it is necessary to have a good GPR obtained signal processing to retain only mine signals.

Electrical Impedance Tomography (EIT) uses electric currents to create an image of the site conductivity distribution. These systems use a two dimensional arrangement of electrodes placed on the surface, which collect signals from conductivity distribution that can provide information regarding the presence of mines. Among its advantages, it should be mentioned that it is sensitive to metal and non-metal detection as both may create anomalies in the conductivity; in addition, it exhibits good performance on wet grounds, and equipment is relatively simple and inexpensive. The main disadvantage however, is that sensors should be in contact with the surface, which may cause the mine to be detonated. A further disadvantage is that it does not work properly in very dry areas such as deserts or rocky surfaces since conductivity is very weak. In addition, it only serves for detecting objects that are very close to the surface.

X-rays (XBS) are usually used to produce images of an object through attenuation undergone by photons passing therethrough. Since photons penetrating the ground are impossible to be captured, as it is unfeasible to place an X-ray detector under the mines, X-Ray Compton scattering principle is used by these systems, i.e. photons irradiated by the object when receiving X-rays are captured. It is thus possible to design a system having a transmitter and receiver device on the surface. The use of this technology has three major advantages: a) the obtained information is sufficient to detect all the evenly placed mines, b) non-metal mines can be detected, c) mines placed under a variety of ground conditions can be detected (including different types of vegetation). One of the main features pointed by the authors is obtaining of an image that can be easily analyzed by a human operator. However, due to the low range of energy needed by the sensor, the use of this technology is limited to surface mine detection (less than 10 cm from the surface), since an appropriate signal to noise will not be obtained by mines placed deeper. Additionally, as such equipment works with X-rays, it is necessary to have all the measurements to ensure that no operator is exposed to radiation.

Infrared and hyperspectral methods detect abnormal variations in electromagnetic radiation reflected or emitted by mine surfaces or the ground located immediately over the mine. The idea is that the areas where mines are located these energies are reflected in a manner different from the surrounding areas. Thermal sensors are enclosed within this group exploiting the phenomenon of the difference between ground and mine temperature variations as a result of nocturnal cooling and diurnal heating rates. Thermal methods have high performance only in homogeneous ground. Laser light or high power microwave radiation can be used to induce these differences. Among the advantages it should be noted that these methods are safer since no physical contact with the surface is required; equipments used are light and image acquisition is fast. The main disadvantage however is that performance is highly variable and it greatly depends on environment characteristics. Some authors have stated that these sensors need greater maturity.

Acoustic and seismic systems emit sound waves with loudspeakers to shake ground surface. The sensors used capture waves reflected from the ground and the mines. Mine detection is made possible by the difference both in bandwidth and frequency of these waves. There are special sensors that need not be in contact with the surface. Trials show that this technique is very suitable for anti-tank mine detection. Since through this technology mechanical differences between soil and mine are detected, they can supplement the information obtained by the magnetic sensors, in order to obtain a better performance. They have a low false alarm rate, however the detector may be misled by bottles or cans. The main disadvantage is that they are able to detect deeply buried mines. In addition, sampling speed is too slow: 2-15 min/m². There is also research on the use of ultrasound for characterizing underground materials, however there is still the need for further researching in this area in order to objectively determine which are the operating ranges for this technique.

Vapor detector technique uses the fact that a small percentage of explosive gets out in vapor from through cracks and structures in mine housing. The idea of the explosive vapor detectors is to determine whether vapors belonging to the explosives in the area. There are two major trends in this field: biological and chemical detectors.

Explosive detection techniques seek for directly detecting the explosive, and not the mine metal housing or shape. Among them there are those based on the nuclear quadripole resonance (NQR) principle and other methods that employ the interaction of neutrons with explosive components. These methods become of high importance in detecting explosives in passenger baggage.

However, relative numbers of specific atoms can at best be measured through these methods, but the present molecular structure can not be determined through them. This for example causes water to produce such a large number of false alarms, due to its high hydrogen content. By building images from this information it is possible to analyze the signal as a whole, thus achieving false alarms from mines to be discriminated. These techniques can be used as complementary to confirm other detections.

It is noted that there are several technologies for mine detection, however, each having good performance only in one type of mine. In deciding which technology is to be used it is also necessary to make a study on the environment in which mines are (vegetation, ground homogeneity and type), as well as a study of the type of mines laid and the type of explosives used, in some cases this information can be obtained either with a careful initial inspection or from already public military reports because of the ending of the conflict that led to mine the fields.

U.S. Pat. No. 5,673,050 to Moussally George; Ziemicki Robert; Fialer Philip A; Heinzman Fred Judson, entitled "Three-dimensional underground imaging radar system", discloses a system comprising a radar antenna including a transmitter and receiver device on a radar platform for transmitting an interrupted, frequency modulated continuous wave (FMCW) addressed to the area of interest below the surface and receiving a reflected wave (echo wave) from the area of interest underground. Such FMCW is transmitted when an airborne vehicle circumscribes the area of interest below the surface, and said reflected wave (echo wave) is being received by the radar antenna when the area of interest below the surface is circumscribed by said airborne vehicle. This system uses stepped frequency, with the air platform path being in a straight line. This type of frequency allows greater sharpness to be obtained and the airborne vehicle path allows the illuminated area to be optimized. In addition, this system includes positioning means (using GPS data), in communication with the radar antenna for locating said radar antenna relative to the area of interest below the surface.

U.S. Pat. No. 5,502,444, to Kohlberg Ira, entitled "Method and apparatus for improving the signal-to-clutter ratio of an airborne earth penetrating radar" discloses a method for detecting objects below the surface using an aircraft with radar pulse for performing detection, from distances greater than 50 meters, while using a continuous transmission radar for performing detection of distances under 50 meters.

US patent application 2006087471 to Hintz Kenneth J., entitled "Syntactic landmine detector" discloses a method for landmine identification through an indicator system referred to as syntactic parameters. It only delivers information on the existence of landmines.

However, none of these documents uses ground marking based methodology for georeferencing, which provides better accuracy and safety in determining the coordinates of the detected objects in the image, resulting in a final risk map whether it is paper or digital. Stepped frequency is employed in transmission allowing high resolution to be obtained. Furthermore, this invention allows on site remapping of the coordinates of the object detected by radar.

Then, the object of the present invention is to provide an integrated system for detecting, locating and identifying antipersonnel and antitank mines for application in humanitarian demining by using a GPR based noninvasive electromagnetic geophysical technique. This system delivers consistent solutions to mitigate the effects of antipersonnel and antitank mines and increase certainty on certification of raised fields.

SUMMARY OF THE INVENTION

The system for detecting, locating and identifying antipersonnel and antitank mines for application in humanitarian demining considers the integration of a mathematical modeling and computer simulation subsystem, considering the calculation of natural frequencies and resonance of antipersonnel mines on unbounded, inhomogeneous environment, in order to determine the optimal frequencies at which a synthetic aperture radar (SAR) is to be operated for mine detection; a radar design and building subsystem, considering design, integration, installation and operation of a synthetic aperture radar based on selected frequencies in modeling and simulation subsystem, implemented in an air platform of the helicopter type and adjustment for use on the ground; an image re-building and processing subsystem, which considers identification and classification of signals delivered by the radar and their conversion to output data through the implementation of efficient built-in algorithms and software allowing subsequent mine georeferencing; and a georeferencing and risk map subsystem considering the orientation of the data submitted by the image re-building and processing subsystem and general and specific location of each mine placed on the ground, through the use of differential geographic position system (DGPS) technology and adjustment and display dedicated software.

Therefore, there is provided a system for detecting, locating and identifying objects above the ground and below the ground comprising a previously referenced area of interest, an airborne vehicle circumscribing the area of interest which is provided with a radar including an antenna with respective transmitter and receiver device, signal processing means, data storage media and graphical interface means, wherein said radar is a ground penetration radar (GPR) of the heterodyne type, wherein the signal transmitted by the antenna generates a light beam from a strip of land and consists of a sinusoidal electromagnetic signal whose frequency is varied in predetermined and accurate steps. This signal is mixed with the received (reflected) signal, resulting in two sets of values corresponding to the phases of each frequency step or stage. These sets of values obtained over successive scannings (as the antenna moves) are stored in the storage media and then processed in processing means for obtaining a final image or map of the location of said objects above the ground and below the ground.

There is also provided a method for detecting, locating and identifying objects above the ground and below the ground comprising an area of interest, an airborne vehicle circumscribing the area of interest that is provided with a radar comprising an antenna with its respective transmitter and receiver device, signal processing means, data storage media and graphical interface means, comprising:

setting a rectangular reference framework based on a point of reference, base points and orientation points around the area of interest;

transmitting a sinusoidal electromagnetic signal whose frequency is varied in predetermined and accurate stepped stages to illuminate the area of interest and reference framework;

mixing the reflected signal with the signal sent to obtain sets of values corresponding to the phases of each frequency step or stage. These sets of values are obtained over successive scannings as the antenna moves;

applying the inverse Fourier transform to the sets of values in order to obtain a set of range measurements for objects in the ground illuminated by the radar light beam;

sequentially aligning each of the range measurements in the same sequence in which they were obtained from successive scannings for obtaining an image;

processing said image through the use of a detection algorithm which accurately determines the location of each object in the scanning region, obtaining a map of location of objects above the ground and below the ground;

calibrating the map in order to obtain distances and heights expressed in length (meters, inches, etc.).

georeferencing the calibrated image for submitting space coordinate data in the image, according to the following sub-steps:

geometrically encoding the calibrated image to identify and assign a code to each measured point in creating the framework;

building a point densification based on points obtained on the ground in order to generate a digital field model, with which the image is orthogonally rectified and all vertical distortions and exaggerations in the image are corrected;

correlating the pixels in the image in the above point and imposition of ground point coordinates, controlling the location with the points generated in densification;

drawing up a risk map containing object position vectors; and remapping the object coordinates in the image obtained in the previous step for marking on the ground.

BRIEF DESCRIPTION OF THE DRAWINGS

The accompanying drawings, which are included to provide a better understanding of the invention, are incorporated herein and are part of this description, illustrate one embodiment of the invention, and together with the description, serve the purpose of explaining the principles of the invention.

DETAILED DESCRIPTION OF THE INVENTION

Figure 6:
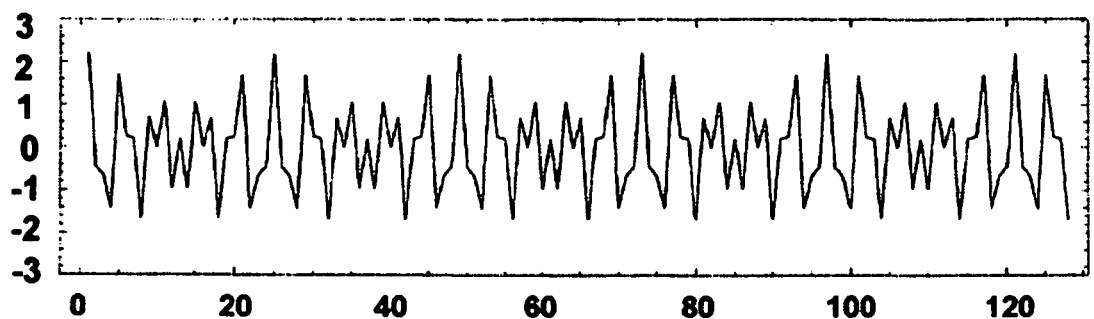
FIG. 6 shows a graph of phase components delivered by the radar for three objects located on the ground area covered by the beam of light.
Figure 7:
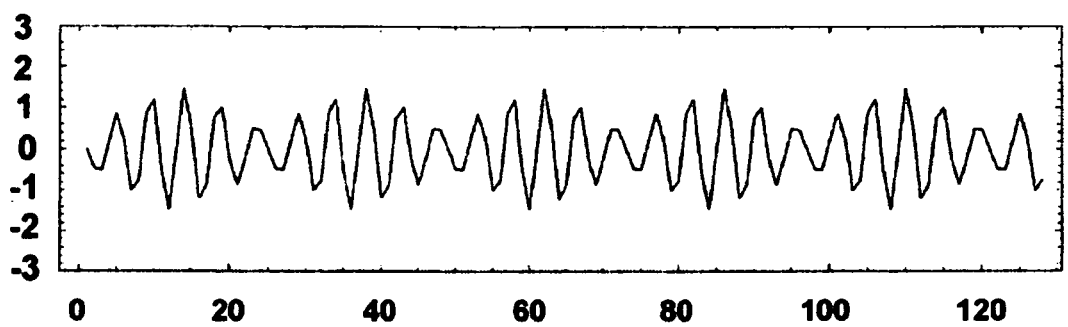
FIG. 7 shows a graph of other phase component delivered by the radar for three objects located on the ground area covered by the beam of light.

The system (1) for detecting, locating and identifying of antipersonnel and antitank mines (2) in its application to humanitarian demining, mainly comprises an airborne vehicle (3), preferably of the helicopter type, which incorporates a radar (4), preferably a stepped frequency radar with the respective antenna and graphical interface. In this type of radar, frequency scanned is not continuous but stepped, synthesizing a high-bandwidth pulse compression technique through the use of sequential transmissions of discrete frequencies on an established band. Its advantages are allowing high resolution as well as continuous wave transmission, both features being highly significant in short-range and high-precision applications, in addition since its architecture is of the heterodyne type, it is possible to set very narrow bandwidths as well as frequency generation is easily achieved through the use of frequency synthesizers, which ensure the required frequency step accuracy. Finally, this type of radar eliminates the problem of the proportionality of the existing bandwidth in continuous frequency scanned radars. The signal transmitted by the antenna consists of a sinusoidal electromagnetic wave whose frequency is varied in predetermined and accurate staggered steps. The received signal is mixed with the signal sent, yielding two sets of values corresponding to the phases of each frequency step or stage. FIG. 6 shows in graphical form one example for the first set of values and FIG. 7 shows one example for the second set of values.

In order to obtain accuracy and resolution suitable for detecting antipersonnel mines (2), the frequency range of operation of the radar should be between 750 MHz and 3000 MHz. These frequencies allow penetrating the ground about 1 meter deep (200) and they are high enough to achieve a suitable detection of small objects. The number of frequency steps set to obtain the necessary resolution is at least 128. The upper limit should not exceed 512 steps in order not to extend too much the radar scanning time and, consequently, extend the signal acquisition time to form the image. On the other hand, and also in order to obtain an appropriate resolution to the task of detecting of small size antipersonnel mines (2), it is necessary that frequency steps have an appropriate value.

For this reason and in order to obtain a 5 cm resolution, 256-step frequency, it is required that each frequency increase is 11.72 MHz. Note that if the number of steps is halved, i.e., 128, it is required that each step is increased twice in frequency for achieving the same resolution, i.e. 23.44 MHz.

Since the objects to be detected will be at a close distance, 10 to 50 m, is not required the power of the radar (4) to be high. Indeed, excess power may be counterproductive as many rebounds can affect signal reading by receiver. It has been established that outputs ranging from 10 W to 250 mW are sufficient for the required work.

Before beginning the task of illuminating the mined area with the frequency signal, a reference framework (5) must be developed subsequently allowing the image to be georeferenced and then the detected coordinates of the mines (2) to be determined.

Figure 1:
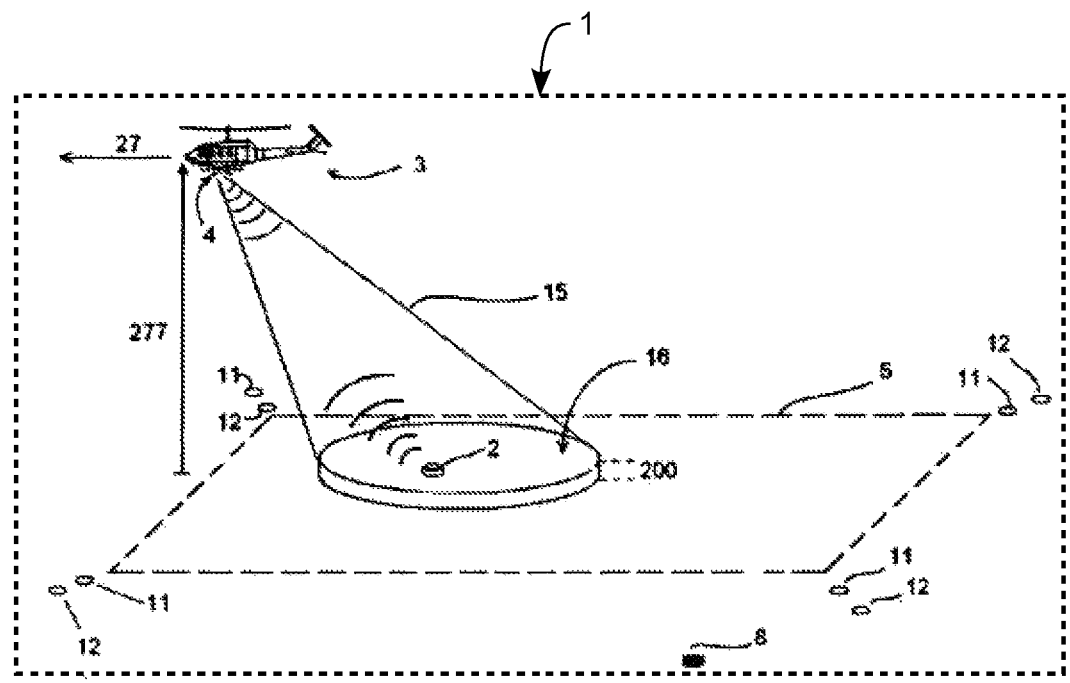
FIG. 1 shows a general diagram of the present invention.
Figure 2:
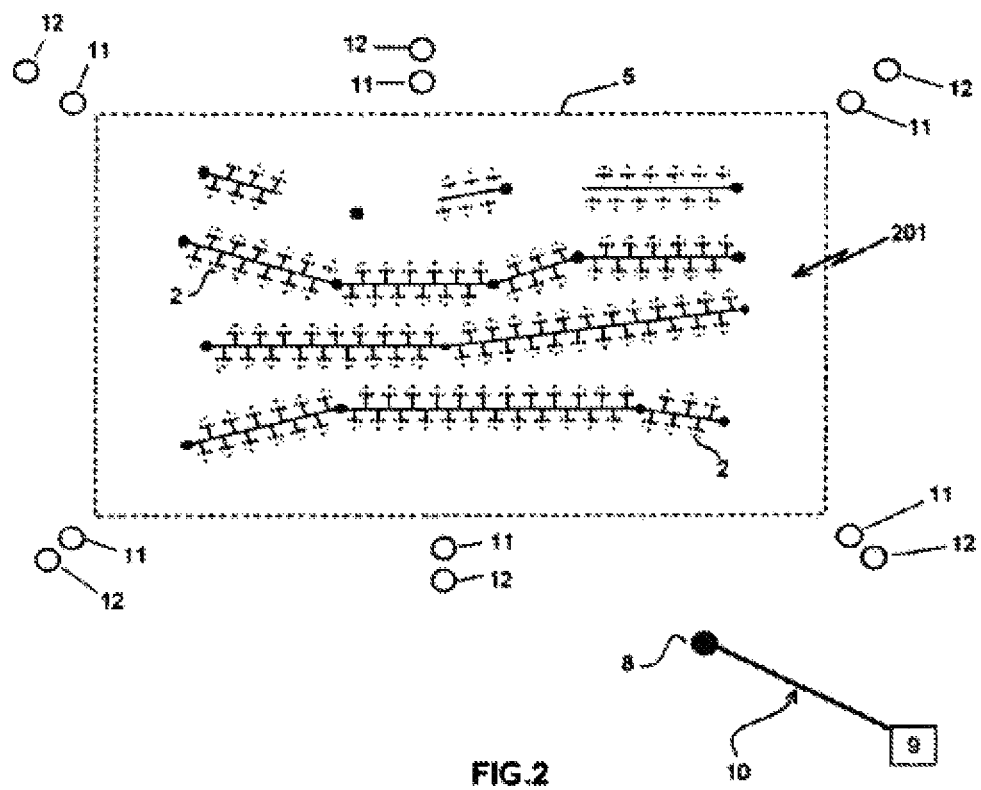
FIG. 2 shows a plan diagram of the present invention.
Figure 3:
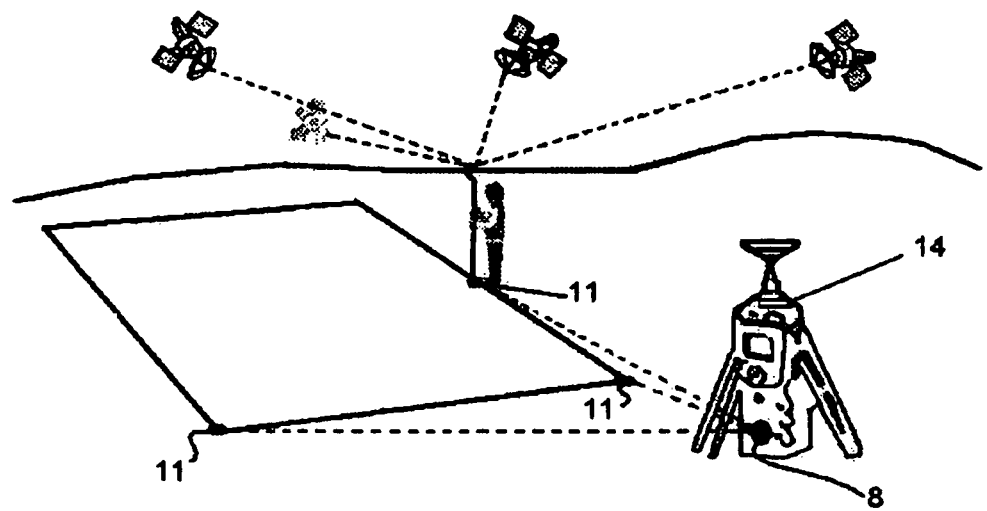
FIG. 3 shows a diagram of base point georeferencing.
Figure 4:
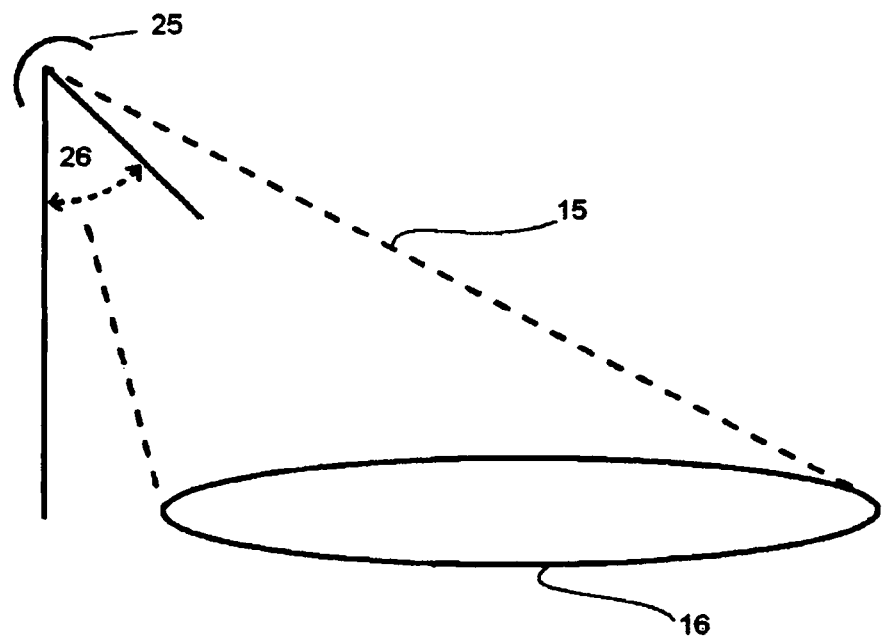
FIG. 4 shows a ground area covered by the beam of light transmitted by the radar of the present invention.

As shown in FIGS. 1 and 2, a reference point (8) is set corresponding to a geodetic reference point linked to an official geodetic network (9) in the particular country, such as the SIRGAS-CHILE National geodetic network, which is to be constituted at the point from which the coordinates to be obtained will be derived and on which a GPS Base unit will be positioned for measuring of the points in the area of the mine field (201).

Such reference point (8) should be a point of the milestone type, consisting of an upright metal pole supported by a concrete base or the like, located no more than 2 km away from of the mine field (201), ideally as close as possible thereto and which will serve as a basis for differential mode GPS (DGPS) geodetic measurements. In addition, it must also be georeferenced with static differential measurement linked to a point in the geodetic network. If this point of geodetic network is no more than 50 km away from the area where the reference framework is being developed corresponding to the mined area, then the reference point (8) must be created with 4 hours of measurement in differential method in DGPS system. On the contrary, if the point in the geodetic network is over 50 km from the working area of the reference framework, then the measurement in differential method should be increased up to 6 hours with 1-second interval. These measurements will be taken by using the static measurement method with a differential GPS for 4 to 6 hours, as appropriate, allowing each vertex of the working area having coordinates with an accuracy of about ±2 cm.

In general for all static measurements, the following parameters have to be considered: Datum: WGS-84; elevation mask: 10°; Measurement range: 5"; Minimum number of satellites: 5; Instrumental height: measured on the ground; System: GPS+GLONASS.

Once measurements for the reference point (8) have been taken, a baseline (10) (network point-reference point) is processed and with this the accurate coordinates of the reference point (8) are obtained.

The next step corresponds to create the rectangular reference framework (5) comprising points adjacent and close to the area of the mine field (201), referred to as base points (11), and they are marked with metal discs, such as aluminum, about 10 cm in diameter attached to a pole of about 50 cm high.

Location of these base points (11) is at the four corners of the rectangular reference framework (5) and at the centers of the larger sides thereof. Depending on the extent of the rectangular reference framework (5) more intermediate base points could be considered.

On the other hand, orientation points (12) are also installed in each of the vertices of the rectangular reference framework (5) and further out of these vertices with respect to the base points (11), such that they are arranged crossways to the base points (11) as shown in FIG. 2, and distant therefrom at a distance of about one meter, with the purpose of having a better orientation of the reference framework (5). These points of orientation (12) are not georeferenced, they are only for orientation and should be under radar scanning region.

Once all of said base points (11) have been located, they must be georeferenced with a GPS unit through the real time kinematik (RTK) method, whose base GPS unit (14) is installed on the reference point (8). This base GPS unit (14) must be in continuous operation, avoiding any discontinuity of operation while performing the measurement of the base points (11). With this method coordinates of each base point (11) are obtained with an accuracy of ±2 cm.

Once the reference framework (5) has been obtained, the lighting of the mine field area (201) is performed by using, for this purpose, the radar (4) implemented on the airborne vehicle (3).

The ground penetration radar (GPR) (4) consists of a discrete step electromagnetic wave generator equally spaced in frequency in the range of 750-3000 MHz. The system further comprises an antenna (25) comprising a transmitting antenna for illuminating the area to be scanned and a receiving antenna for receiving the signal reflected from the ground surface and the underground objects.

Basic methods needed to obtain a signal with relevant information to subsequently generate an image of the subsurface components using the GPR system are set out hereinbelow.

Illumination of the covered ground area (16) comprises scanning with the transmitting antenna (25), at a height (277) from 5 to 30 meters, allowing a suitable portion of the ground to be covered. Both the radar (4) and the antennae are mounted on a helicopter for being able to safely evolve on the mine field. The transmitting and receiving antennae mounted on the outside of the airborne vehicle (3) must aim at an angle (26) ranging from 35° to 55° from the vertical.

During illumination, the antenna (25) of the radar (4) scans in discrete frequency steps (minimum 64, maximum 512 steps). Each frequency scanning allows key information for determining the distance to each of detectable objects to be obtained, which are on the covered ground area (16) by the light beam. This frequency scanning must be fast (split second), such that by moving the antennae it is possible to obtain a set of distance measurements for the different objects. The locus of the distances will allow the location of each of the objects composing the scene to be pinpointed.

To obtain a pattern that is reliable and possible to be processed for object loci, both the transmitting and the receiving antenna (25) of the radar (4), mounted outside the airborne vehicle (3), must be moved at a constant speed 27) and at a constant height (277), along a vertical line perpendicular to the vertical and to the light beam axis. With this, a scanning of a strip on the ground (16) is obtained.

During scanning (28), all the information received by the receiving antenna and pre-processed by the receiver of the radar is stored in a computer fitted in the airborne vehicle (3). This information is the raw material for subsequently generating images of the ground surface and subsoil. In addition, it is necessary to store continuous data of speed and height of the airborne vehicle (3), obtained from a precision GPS mounted therein. These must be synchronized with the data received by the receiving antenna of the radar, so as to allow calibration of the image or map coordinates.

Data obtained from scanning (28) performed by the radar (4) on the area of the mine field (201) is extracted and submitted to the equipment intended for image processing and acquisition.

The first step consists in generating range sequences. Data obtained from the GPR radar receiving antenna and preprocessed by the GPR receiver are processed on a computer using the inverse Fourier transform. This allows obtaining a sequence of measurements of distances (range measurements) to the different objects found in the subsoil.

Figure 8:
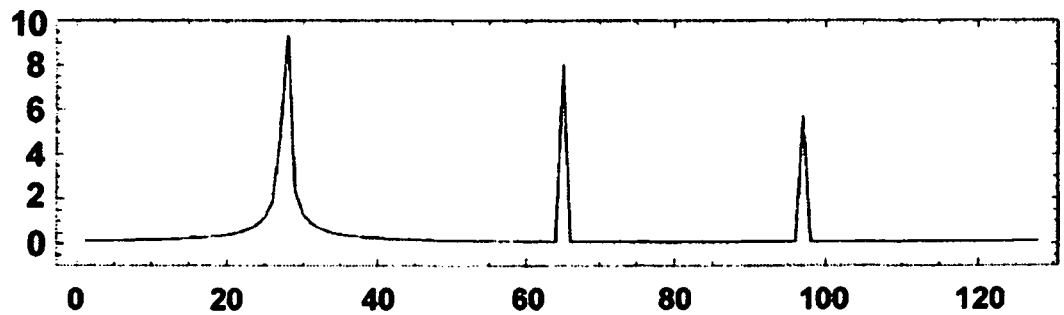
FIG. 8 shows a graph of the Fourier transform of the graphs in FIGS. 6 and 7.

As initially stated, two sets of values corresponding to the phases for each frequency step are generated by mixing of the signal transmitted by the radar with the sent one. FIG. 6 shows the first set of 128 values obtained from a simulated version of the radar signal (4) for three objects located on the ground area (16) covered by the light beam at distances of 5, 12 and 18 m. FIG. 7 shows the second set of values obtained from the same simulation for the same three objects located on the ground area (16) covered by the light beam at distances of 5, 12 and 18 m. With these two signals, formed by both sets of values, and through a mathematical process based on the inverse Fourier transform, it is possible to obtain a chart of distances for the three objects, as shown in FIG. 8. Note that in FIG. 8 distances appear in positions 27, 65 and 97. To obtain the distance in meters it is necessary to multiply these values by the resolution given by frequency steps used in the simulation, which is 0.1852 m.

Figure 5:
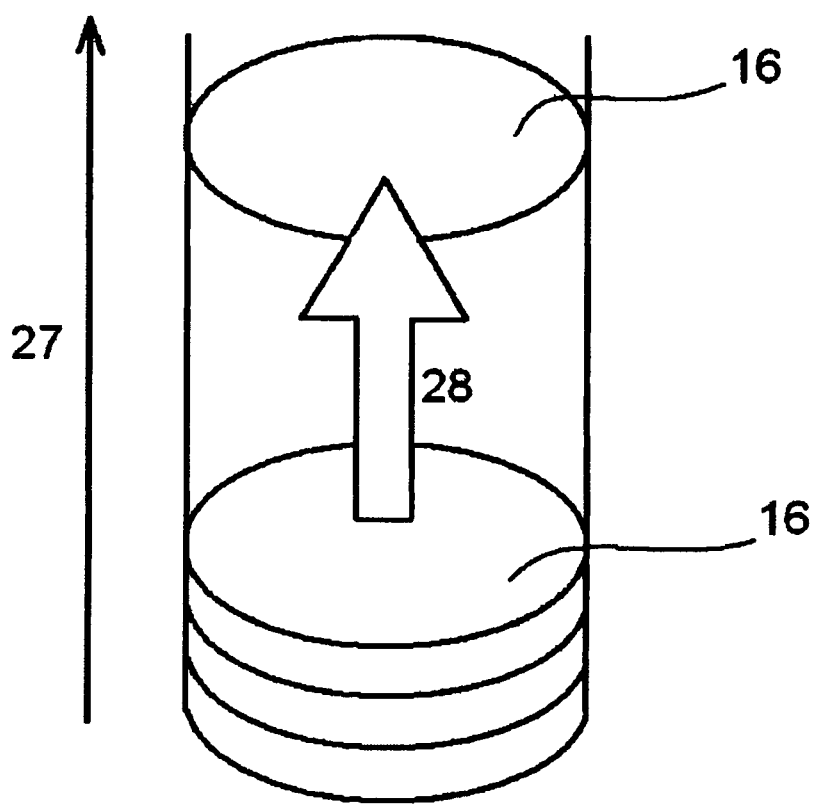
FIG. 5 shows the direction of movement of the antennae and the area scanned by the radar of the present invention.

When both the transmitting and the receiving antenna (25) move in a straight line forming a scanning, as shown in FIG. 5, the position of objects lying on the ground through can be determined by a series of range measurements as scanning progresses. The object(s) located on the ground and within the area covered by the light beam (16) of the radar (4) begin to approach the antennae, until reaching a minimum value, and then move away therefrom until leaving the area covered by the beam (16). Successive range measurements made will indicate a displacement in object positions to the left when approaching the antennae, and then a displacement to the right when moving away.

Figure 9:
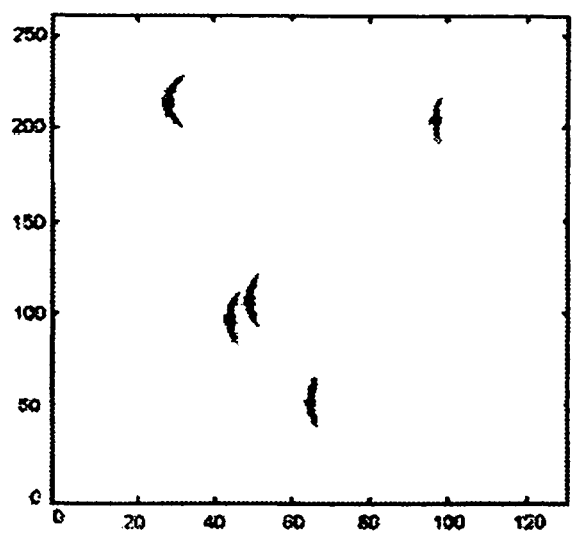
FIG. 9 shows a sequence of range measurements allowing the position of objects on the ground to be determined.

The second step corresponds to the combination of range measurements. The set of range measurements is combined for obtaining an object image. This operation consists in sequentially aligning each of the range measurements in the same sequence they were obtained in the scanning process in the airborne vehicle (3), as shown in FIG. 9. This figure corresponds to the image of a set of 5 objects distributed on an area of 48×48 meters, obtained from a computer-simulated scanning.

The combined set of range measurements is processed by using a detection algorithm allowing the location of each object in the scanning region to be accurately determined, as shown in FIG. 9, where asterisks depict the location of each object. Finally the image is calibrated, that is distances and heights are expressed in meters.

The processed and calibrated image contains the representation of the objects captured by the radar, which require the application of georeferencing procedures to obtain the object coordinates contained therein comprising geometric encoding, which involves moving from the processed and calibrated image to the scope on the ground and corrections to the angle of incidence of the image, based on measurements of the points created in the reference framework. This allows a correspondence between the position of the points in the final image and its location on a given map projection, in summary: submitting spatial coordinate data in the original image, and thus representing all of the objects contained in the image.

For the location of ground data in a georeferenced and projected space, it is necessary to analyze the data obtained on the ground and project them on the ground. Based on the GPS points Excel format file generated by the software of the equipment the code of each point measured in creating the framework is determined and assigned.

Conversion scope is used, which method consists in positioning values of the image and locating it on the ground to project it based on a coordinate system. It is necessary to know the geometry of the image creation, height of the airborne vehicle (3), time delay between signal from the region closest to the radar with respect to the furthest one, and ground elevation. Resampling, corresponding to a pixel rearrangement, is used to create the even spacing between them (in the scope domain on the ground) across the complete image width.

Scope conversion on the ground may be performed either during signal processing or during image processing. It is usually applied after radiometric correction. The approach and the algorithms used are dependent on analysis purposes.

Polynomial transformation uses best fit. Radar image obtained without georeferencing or orthogonal rectification is changed to fit a map projection using various orders.

Higher order transformations require a larger number of ground control points (GPS) for being able to produce the transformation model. High order does not ensure better accuracy. Image points are generally approached to GPS ones by a higher order transformation, but errors in points away from GPS ones may be increased. Having said that, the GPS points are located on a georeferenced map.

The next step in georeferencing is building a point densification based on points obtained on the ground in order to generate a digital field model, with which the image can be orthogonally rectified and all deformations and vertical exaggeration in the image corrected.

The next step in georeferencing is the correlation between image pixels and imposition of ground point coordinates, controlling the location with the points generated through densification. Based on pixel size as well as image spatial resolution the mean square error is determined. Having the image corrected to points, cubic convolution method is used, which takes the weighted average of sixteen surrounding pixels to estimate the digital value for the final corrected image, this process provides a good record and appearance of the product.

Once the above has been performed, the risk map can be made. It is generated in a 60×60 cm paper format. This risk map contains object position vectors in DXF and SHP format (ESRI Shapefile and DXF drawing exchange format of other CAD software.)

As a leading factor in a topographic map flying height is a precision indicator whereby the tolerance determined by the scale for an image obtained with radar data will be the pixel size, this being referred to as spatial resolution of the image. In case of validation these maps should contain centimeter-level precision whereby their scale should not exceed 1:250 (1 mm on the paper equals 25 cm on the ground).

These hybrid maps contain image relating to ground roughness with 20% transparency, plus a grid defined over a maximum distance of one meter. Above the distortion itself of the AP and AT (anti-personnel and anti-tank) objects, there will be a vector generated at the center of each AP and AT mines, to obtain these elements it is necessary a magnification of the object image located in the center thereof.

Figure 10:
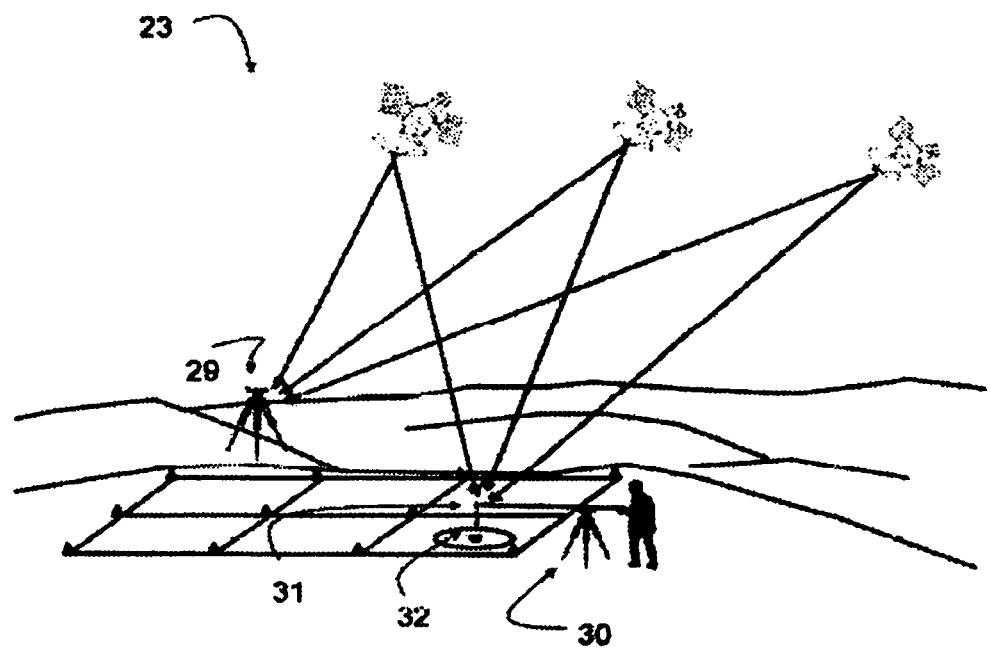
FIG. 10 shows a diagram of the system for remapping the location of the object detected by radar.
Figure 11:
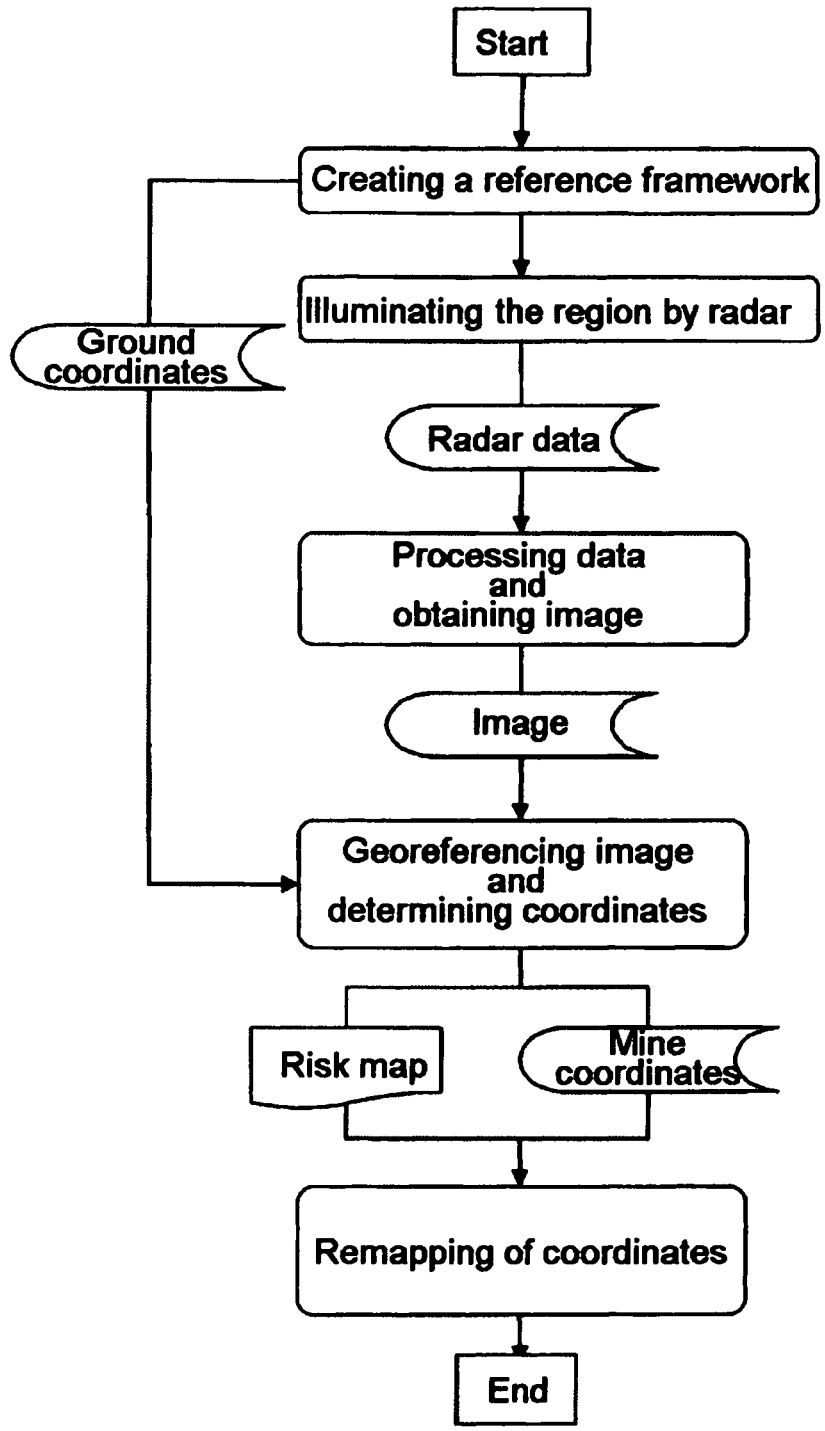
FIG. 11 shows a flow chart of the mine detection method of the present invention

The system concludes and its objective is achieved when marking on the ground the location of the object detected by the radar, that is, remapping, (see FIG. 10).

Remapping (23) consists in taking the obtained coordinates of the objects in the image and using a DGPS unit, marking them on the ground. For this purpose real time kinematik (RTK) measurement method is used, for which a base and mobile GPS, a radio modem system, and the previously created remapping system are used.

As shown in FIG. 10, the base GPS (29) is installed on the reference point (8) in the mine field (201).

As it is known the reference framework (5), that allows for a high level of security for approaching the mine field (201), starts remapping the coordinates of the object detected by the radar (4). This requires scheduling a book, which is part of the mobile GPS unit (30), and which makes it possible to submit the coordinates of the detected objects to be remapped.

Once the coordinates have been submitted in the book of the mobile GPS unit (30), the following is displayed on its screen: graphical display of the submitted points; display of plane coordinates, display of direction and distance, display of distance in meters, and direction in degrees as well as the position of the mobile GPS unit (30) itself.

In graphic remapping one of the submitted coordinates is selected, and the unit graphically displays the distance thereto and its direction referred to magnetic north.

The antenna (31) of the mobile GPS (30) is installed on the system created for remapping (23). This system created for remapping (23) comprises a tripod where a metal structure containing a 4 m long polycarbonate stick moving in a radial and retractable fashion is to be installed. At one end of this stick the antenna (31) of the mobile GPS (30) is provided having a vertical elbow such that measuring of coordinates visible on the book screen will be actually where the identified mine is.

When the antenna (31) of the mobile GPS (30) is in the required coordinate, the fact that it was obtained a coincidence between the submitted coordinate and that obtained by the mobile GPS (30) is shown graphically and through a sound alarm by the mobile GPS unit (30), In order to mark the location of the object (mine) on the ground, a paint mark (32) is used, which is released from a polycarbonate stick end under the antenna (31) of the mobile GPS (30), this being operated from a device fitted on the tripod.

The invention claimed is:

1. A system for detecting, locating and identifying objects above the ground and below the ground comprising:
   an area of interest;
   an airborne vehicle circumscribing said area of interest, that is provided with a radar comprising an antenna having a transmitter device and a receiver device;
   a signal processing means;
   a data storage means; and
a graphical interface means, wherein said area of interest is previously referenced and said radar is a ground penetration radar of the heterodyne type in which signal transmitted by the antenna generates a light beam from a strip of land and consists of a sinusoidal electromagnetic signal whose frequency is varied in predetermined and accurate steps , wherein said transmitted signal is mixed with the received or reflected signal for each step, resulting in two sets of values corresponding to the phases of each frequency step, and wherein the two sets of values obtained over successive scannings are stored in the storage means and subsequently processed in processing means for obtaining a final image of the location of said objects above the ground and below the ground, wherein the obtained object image is calibrated with distances and heights comprising spatial coordinate data, and wherein said processing means further geometrically encode the final image by determining a code for each measured point of said area of interest and assigning said code to said each measured point.

2. A system for detecting, locating and identifying objects above the ground and below the ground as claimed in claim 1, wherein the previously referenced area of interest consists of a rectangular reference framework that is drawn up based on a reference point, base points and points of orientation, which allows subsequently georeferencing of processed values and determining the coordinates of the objects above the ground and below the ground, in an image or map form.

3. A system for detecting, locating and identifying objects above the ground and below the ground as claimed in claim 2, wherein said reference point is linked to a geodetic reference point belonging to an official geodetic network.

4. A system for detecting, locating and identifying objects above the ground and below the ground as claimed in claim 3, wherein if said point in the geodetic network is located within 50 km from the reference point of the reference framework, then the measurement of the differential method of the reference point is a 4 hour measurement with an interval of 1 second.

5. A system for detecting, locating and identifying objects above the ground and below the ground as claimed in claim 3, wherein if said point in the geodetic network is over 50 km. from the reference point of the reference framework, then the measurement of the differential method of the reference point is a 6 hour measurement with an interval of 1 second.

6. A system for detecting, locating and identifying objects above the ground and below the ground as claimed in claim 2, wherein said base points are points adjacent and close to the area of interest and they are marked with metal discs attached to a pole.

7. A system for detecting, locating and identifying objects above the ground and below the ground as claimed in claim 6, wherein said base points are located at the four corners of the reference framework, wherein the larger side of said reference framework further comprises at least one intermediate base point.

8. A system for detecting, locating and identifying objects above the ground and below the ground as claimed in claim 2, wherein said points of orientation are located at each of the vertices of the reference framework and further out of these vertices with respect to the base points, such that they are arranged crossways to the base points, distant from them at a distance of about one meter.

9. A system for detecting, locating and identifying objects above the ground and below the ground as claimed in claim 7, wherein said base points are georeferenced points by a base Global Positioning System unit through real time kinematik (RTK) method, wherein such base Global Positioning System unit is installed above the reference point.

10. A system for detecting, locating and identifying objects above the ground and below the ground as claimed in claim 4, wherein measuring in the differential method of the reference point allows coordinates with an accuracy of about ±2 cm to be generated by each base point in the reference framework.

11. A system for detecting, locating and identifying objects above the ground and below the ground as claimed in claim 5, wherein measuring in the differential method of reference point allows coordinates with an accuracy of about ±2 cm to be generated by each base point in the reference framework.

12. A system for detecting, locating and identifying objects above the ground and below the ground as claimed in claim 1, wherein the sinusoidal electromagnetic signal whose frequency is varied in equal stepped stages is in the range of 750-3000 MHz.

13. A system for detecting, locating and identifying objects above the ground and below the ground as claimed in claim 12, wherein said stepped stages are discrete frequency steps with a minimum of 64 steps and a maximum of 512 steps.

14. A system for detecting, locating and identifying objects above the ground and below the ground as claimed in claim 1, wherein said radar comprises an antenna with its respective transmitter and receiver device that is fitted outside the airborne vehicle, which orientation, to generate the light beam scanning, ranges from 35.degree. to 55.degree. to the vertical.

15. A system for detecting, locating and identifying objects above the ground and below the ground as claimed in claim 14, wherein said antenna moves with constant speed and constant height along a line perpendicular to the vertical and to the light beam axis.

16. A system for detecting, locating and identifying objects above the ground and below the ground as claimed in claim 15, wherein said speed and height values are obtained by a precision Global Positioning System unit fitted in the airborne vehicle, which are synchronized with the values received by the radar receiver, so as to allow the image coordinates to be calibrated.

17. A system for detecting, locating and identifying objects above the ground and below the ground as claimed in claim 1, wherein said processing means generate range sequences or distance measurements to the different objects above the ground and below the ground, using the inverse Fourier transform.

18. A system for detecting, locating and identifying objects above the ground and below the ground as claimed in claim 17, wherein said range sequences are combined for obtaining an object image, consisting in sequentially aligning each of the range measurements in the same sequence they were obtained in the scanning process.

19. A system for detecting, locating and identifying objects above the ground and below the ground as claimed in claim 18, wherein said combination of range measurements are processed using a detection algorithm that allows the location of each object in the scanning region for obtaining an image of the object detected to be accurately determined, wherein the location is determined by georeferenced height and distance values.

20. A system for detecting, locating and identifying objects above the ground and below the ground as claimed in claim 1, wherein said processing means further position the image values and place them on the ground to project it based on a coordinate system.

21. A system for detecting, locating and identifying objects above the ground and below the ground as claimed in claim 20, wherein said processing means further rearrange pixels for creating even spacing between them across the complete width of the image.

22. A system for detecting, locating and identifying objects above the ground and below the ground as claimed in claim 21, wherein said processing means further build densification of points based on points obtained on the ground in order to generate a digital field model with which the image is orthogonally rectified in order to correct all the vertical distortions and exaggerations of the image.

23. A system for detecting, locating and identifying objects above the ground and below the ground as claimed in claim 22, wherein said processing means further correlate the pixels of the image and imposition of ground point coordinates, controlling the location with the points generated in densification.

24. A system for detecting, locating and identifying objects above the ground and below the ground as claimed in claim 23, wherein said processing means further calculates the mean square error based on the pixel size as well as the spatial resolution of the image.

25. A system for detecting, locating and identifying objects above the ground and below the ground as claimed in claim 24, wherein said processing means further calculate the weighted average of sixteen surrounding pixels to estimate the digital value for the final corrected image through cubic convolution.

26. A system for detecting, locating and identifying objects above the ground and below the ground as claimed in claim 25, wherein said processing means further draw up a risk map containing the position vectors of detected objects.

27. A system for detecting, locating and identifying objects above the ground and below the ground as claimed in claim 26, wherein said processing means further perform a remapping through the real time kinematik (RTK) method of measurement, consisting in taking the obtained coordinates of the objects in the image and using a Differential Global Positioning System unit and marking them on the ground.

28. Method for detecting, locating and identifying objects above the ground and below the ground comprising an area of interest, an airborne vehicle circumscribing said area of interest, that is provided with a radar comprising an antenna with its respective transmitter and receiver device, signal processing means, data storage means and graphical interface means, characterized in that it comprises:

setting a rectangular reference framework based on a point of reference, base points and orientation points around the area of interest;

transmitting an sinusoidal electromagnetic signal whose frequency is varied in predetermined and accurate stepped stages to illuminate the area of interest and reference framework;

mixing the reflected signal with the signal sent to obtain sets of values corresponding to the phases of each frequency step or stage, wherein said sets of values are obtained over successive scannings as the antenna moves;

applying the inverse Fourier transform to the sets of values in order to obtain a set of range measurements for objects in the ground illuminated by the radar light beam;

sequentially aligning each of the range measurements in the same sequence in which they were obtained from successive scannings for obtaining an image;

processing said image through the use of a detection algorithm, which accurately determines the location of each object in the scanning region, obtaining a map of location of objects above the ground and below the ground;

calibrating the map in order to obtain distances and heights expressed in length; georeferencing the calibrated image to submit space coordinate data in the image, according to the following sub-steps: geometrically encoding the calibrated image to identify and assign a code to each measured point in creating the framework;

building a point densification based on points obtained on the ground in order to generate a digital field model, with which the image is orthogonally rectified and all vertical distortions and exaggerations in the image are corrected;

correlating the pixels in the image in the above point and imposition of ground point coordinates, controlling the location with the points generated in densification;

drawing up a risk map containing position vectors of the objects; and remapping the object coordinates in the image obtained in the previous step for marking on the ground.

29. Method for detecting, locating and identifying objects above the ground and below the ground as claimed in claim 28, wherein said reference point is correlated to a geodetic reference point belonging to an official Geodetic Network.

30. Method for detecting, locating and identifying objects above the ground and below the ground as claimed in claim 29, wherein if said point in the geodetic network is located within 50 km from the reference point of the reference framework, then the measurement of the differential method of the reference point is a 4 hour measurement with an interval of 1 second.

31. Method for detecting, locating and identifying objects above the ground and below the ground as claimed in claim 29, wherein if said point in the geodetic network is located within 50 km from the reference point of the reference framework, then the measurement of the differential method of the reference point is a 6 hour measurement with an interval of 1 second.

32. Method for detecting, locating and identifying objects above the ground and below the ground as claimed in claim 28, wherein said base points are located adjacent and close to the area of interest at the four corners of the reference framework wherein the larger side of said reference framework further comprises at least one intermediate base point and wherein said base points and said at least one intermediate base point are marked with metal discs, wherein each one of said metal discs is attached to a pole.

33. Method for detecting, locating and identifying objects above the ground and below the ground as claimed in claim 28, wherein said points of orientation are located at each of the vertices of the reference framework and further out of these vertices with respect to the base points, such that they are arranged crossways to the base points, distant from them at a distance of about one meter.

34. Method for detecting, locating and identifying objects above the ground and below the ground as claimed in claim 28, wherein said base points are georeferenced points by a base Global Positioning System unit through real time kinematik (RTK) method, wherein such base Global Positioning System unit is installed above the reference point.

35. Method for detecting, locating and identifying objects above the ground and below the ground as claimed in claim 28, wherein the orientation of said radar antenna, to generate the light beam scanning, ranges from 35.degree. to 55.degree. to the vertical.

36. Method for detecting, locating and identifying objects above the ground and below the ground as claimed in claim 35, wherein said antenna moves with constant speed and constant height along a line perpendicular to the vertical and to the light beam axis.

37. Method for detecting, locating and identifying objects above the ground and below the ground as claimed in claim 36, wherein said speed and height values are obtained with a precision Global Positioning System unit fitted on the airborne vehicle, which are synchronized with the values received by the radar receiver, for the calibration of the image coordinates.

38. Method for detecting, locating and identifying objects above the ground and below the ground as claimed in claim 28, wherein said combination of range measurements is processed using a detection algorithm that allows the location of each object in the scanning region for obtaining an image of the object detected to be accurately determined.

39. Method for detecting, locating and identifying objects above the ground and below the ground as claimed in claim 38, wherein it further comprises positioning image values and locating them on the ground to project them based on a coordinate system.

40. Method for detecting, locating and identifying objects above the ground and below the ground as claimed in claim 39, wherein it further comprises rearranging pixels for creating even spacing between them across the complete width of the image.

41. A method for detecting, locating and identifying objects above the ground and below the ground as claimed in claim 28, wherein said processing means further position the image values and place them on the ground to project it based on a coordinate system.

* * * * *